United States Patent
Bertetti

[19]

[11] Patent Number: 6,139,216
[45] Date of Patent: Oct. 31, 2000

[54] REVERSIBLE DEVICE FOR LOCKING A CONSTANT-VELOCITY JOINT TO A HUB

[75] Inventor: Paolo Bertetti, Turin, Italy

[73] Assignee: SKF Industrie S.p.A., Turin, Italy

[21] Appl. No.: 08/984,285

[22] Filed: Dec. 3, 1997

[30] Foreign Application Priority Data

Dec. 20, 1996 [IT] Italy .................................. TO96A1057

[51] Int. Cl.[7] ........................................................ F16D 3/76
[52] U.S. Cl. .................................. 403/359.3; 403/359.6; 403/365; 403/20; 464/906
[58] Field of Search .................. 403/365, 359.5, 403/359.1, 359.3, 359.4, 359.6, 326, 327, 328, 16, 19, 20, 11; 464/906, 140, 145, 178; 301/124.1, 105.1

[56] References Cited

U.S. PATENT DOCUMENTS

| | | | |
|---|---|---|---|
| 4,150,553 | 4/1979 | Aucktor | .................................. 464/906 |
| 5,049,158 | 9/1991 | Engelhardt et al. | . |
| 5,433,668 | 7/1995 | Harz et al. | .................................. 464/145 |
| 5,549,514 | 8/1996 | Welschof | .................................. 464/145 |

FOREIGN PATENT DOCUMENTS

| | | |
|---|---|---|
| 0 449 698 | 10/1991 | European Pat. Off. . |
| 29501158 U | 1/1995 | Germany . |
| 2 270 054 | 3/1994 | United Kingdom . |

*Primary Examiner*—Terry Lee Melius
*Assistant Examiner*—David E. Bochna
*Attorney, Agent, or Firm*—Merchant & Gould P.C.

[57] ABSTRACT

In a device for reversibly locking a constant-velocity joint (2) with respect to a hub (1), the constant-velocity joint is axially locked to the hub by means of a spring-lock ring (21) of circular cross section recessed in a circumferential groove (22) in part formed on said joint (2) and in part on said hub (1). The joint comprises reaction means (24) integral therewith, particularly a rigid annular diaphragm disposed adjacent to the hub and facing an axial through bore (15) formed in the hub. The diaphragm is adapted for co-operation with an extraction tool (28) that can be inserted through the hub bore (15) in order to apply to the joint (2) and the spring-lock ring (21) an axial force with relative to the hub in either direction so as to separate or couple the joint (2) from or to the hub.

11 Claims, 3 Drawing Sheets

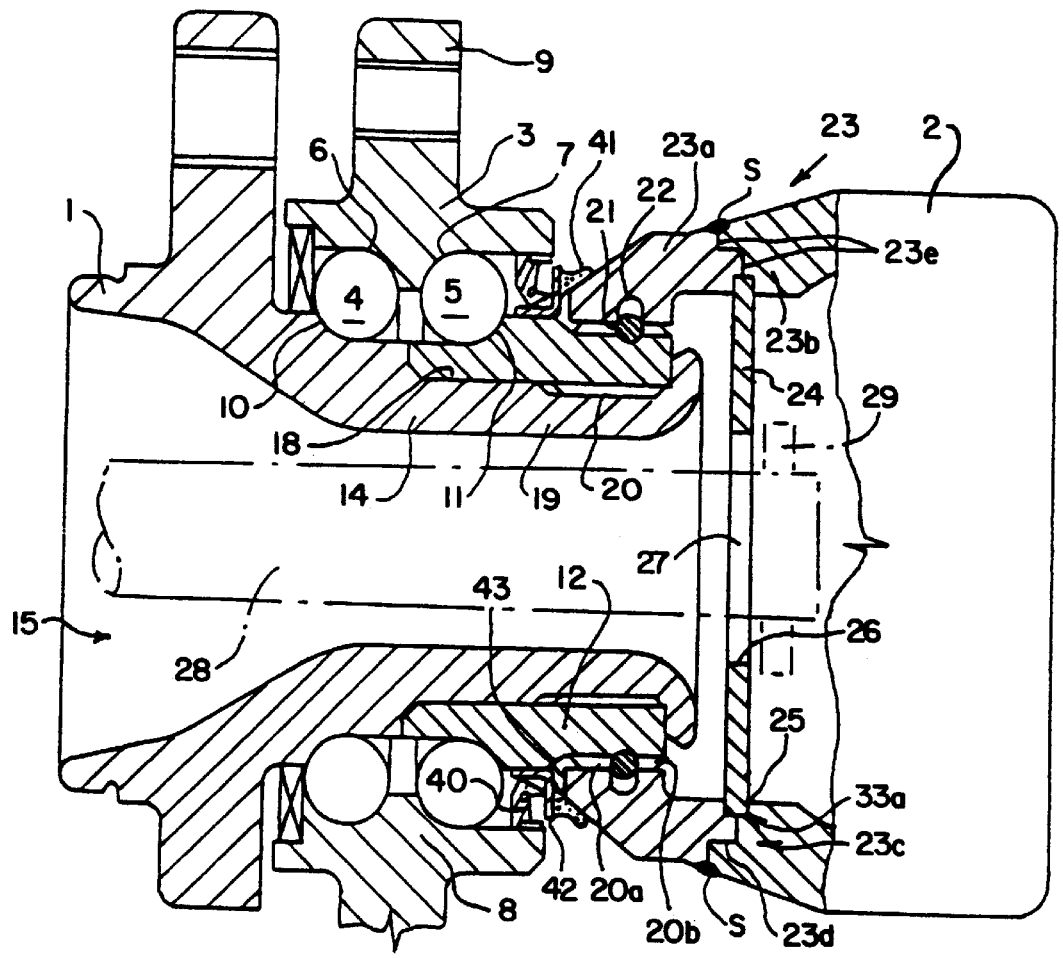
FIG. 2d
FIG. 2e
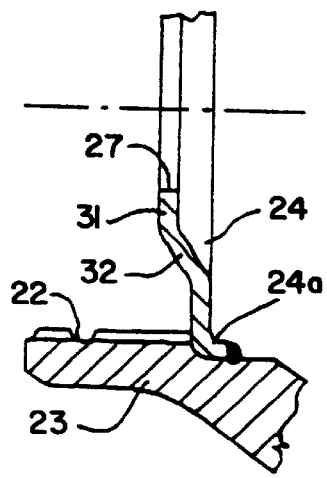

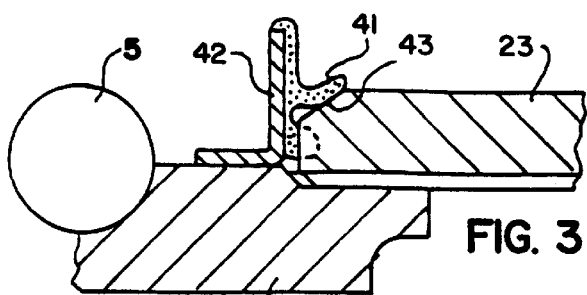
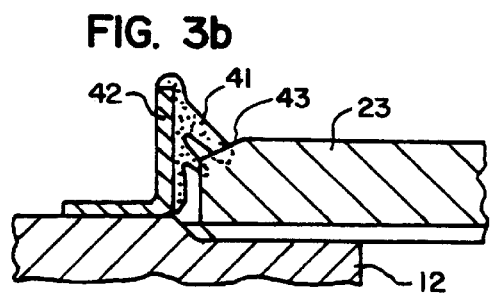
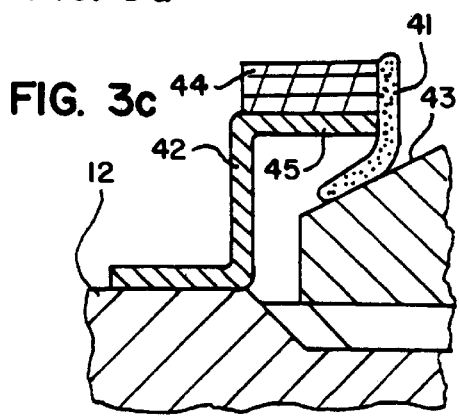
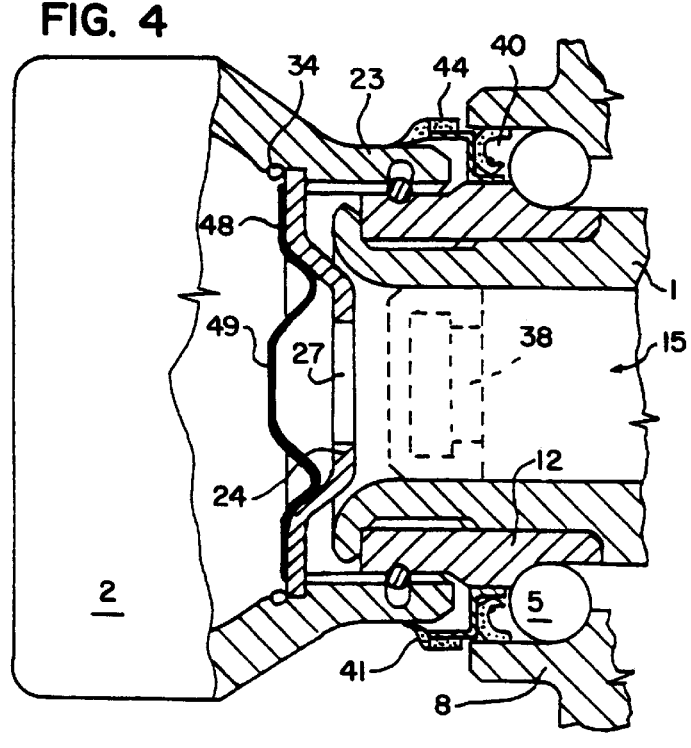
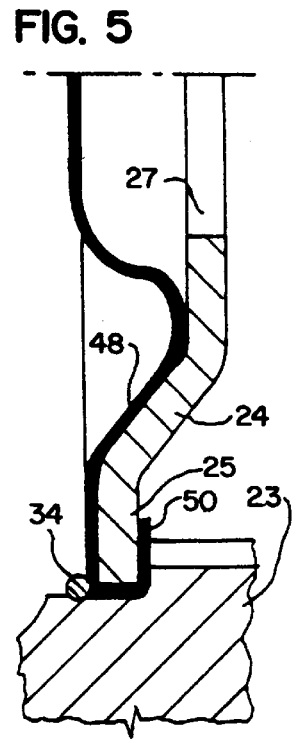

REVERSIBLE DEVICE FOR LOCKING A CONSTANT-VELOCITY JOINT TO A HUB

DESCRIPTION

The present invention refers to a reversible device for locking a constant-velocity joint to a hub. More particularly, the invention relates to a reversible device for locking in reversible manner a constant-velocity joint, hereinafter termed joint, of a joint-wheel hub unit, the joint being axially secured to said unit by means of a spring-lock ring of circular cross-section.

BACKGROUND OF THE INVENTION

It is known to design a joint-hub unit for a driving wheel of a vehicle, wherein the joint is coupled to the hub by interposing an intermediate annular element forcefully fitted on the hub axle and axially secured to the hub by welding or cold rolling an end rim of the axle. The intermediate annular element is mounted to the joint by means of a splined coupling and is axially locked through a spring-lock ring fitted in a circular seat formed in part in the joint and in part on the intermediate annular element.

With such a unit, assembly and disassembly of the joint onto and from the hub, particularly during servicing, can result difficult, as the hub must be released from the joint by removing the spring-lock ring. A possible solution is to perform radial openings at the seat for the spring-lock ring, such as to allow to insert a tool for radially compressing the spring-lock ring and remove it from the joint. Such an arrangement, however, has the drawback of putting the inner parts of the joint in communication with the external environment.

Further, in all of the above mentioned arrangements, moisture and dirt can penetrate into the joint through the clearance of the splined coupling between the hub and the joint. Therefore, expensive and complex sealing devices must be specially provided for. These sealing devices, besides being in some instances difficult to mount, render servicing operations more difficult.

SUMMARY OF THE INVENTION

Against the foregoing background, it is the primary object of the present invention to provide a reversible device for locking a constant-velocity joint to a hub, capable of overcoming the above discussed inconveniences. Particularly, it is an object of the present invention to provide a device capable of allowing a quick assembly and disassembly of the hub-joint unit and at the same time ensuring reliable sealing action at the hub-joint connection with little effort.

Toward the attainment of these and additional objects and advantages, the present invention, briefly summarized, provides a device for reversibly locking a constant-velocity joint with respect to a hub, wherein said constant-velocity joint is axially locked to said hub by means of a spring-lock ring of circular cross section recessed in a circumferential groove in part formed on said joint and in part on said hub, said joint comprising reaction means integral therewith, said reaction means being disposed adjacent to said hub and facing an axial through bore formed in said hub, said reaction means being adapted for co-operation with an extraction tool insertable through said bore to apply to the joint and the spring-lock ring an axial force relative to said hub in either direction so as to separate or couple said joint from or to said hub.

BRIEF DESCRIPTION OF THE DRAWINGS

In order that the present invention may be well understood there will now be described a few preferred embodiments thereof, given by way of example, reference being made to the accompanying drawings, in which:

FIGS. 2a, 2b, 2c, 2d and 2e illustrate alternative embodiments of the mounting of the diaphragm on the socket portion of the joint;

FIGS. 3a, 3b and 3c show different seals for the device of FIG. 1;

FIG. 4 shows an alternative embodiment of a diaphragm of FIG. 1 for hermetically sealing the joint; and FIG. 5 is an axial cross-sectional view, to an enlarged scale, of a detail of a seal fitted to the diaphragm.

DETAILED DESCRIPTION OF PREFERRED EMBODIMENTS

Figure 1:
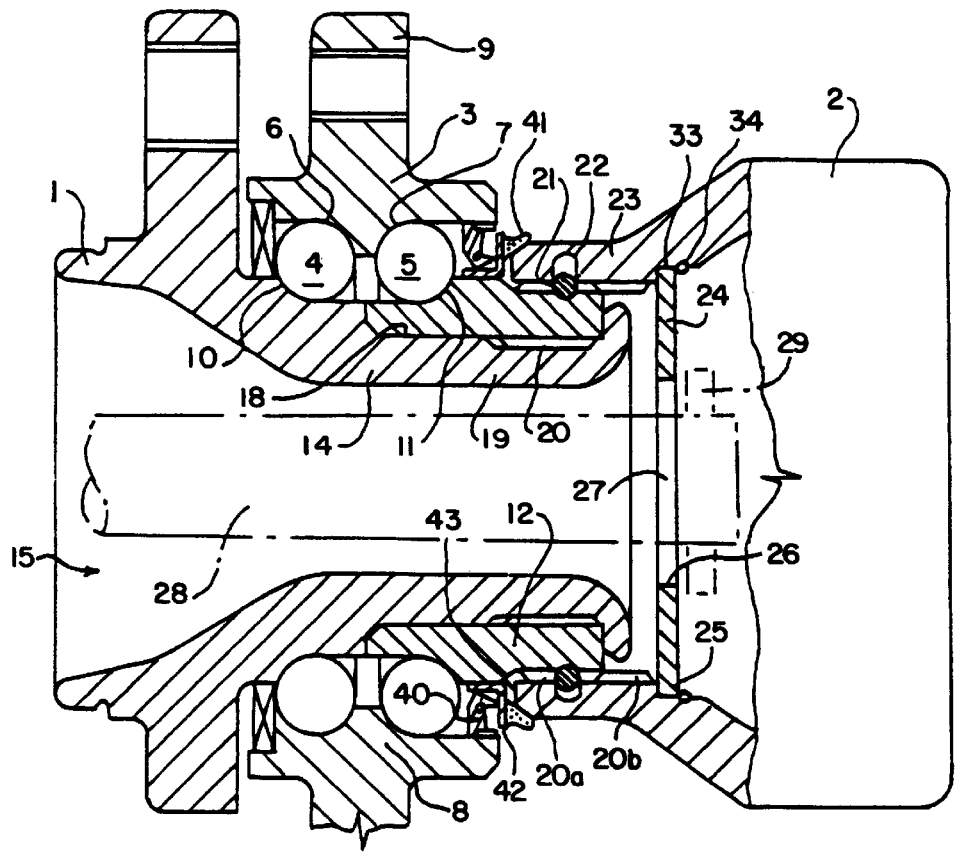
FIG. 1 is an axial cross-sectional view of a reversible locking device according to the present invention, mounted to a joint-hub unit.

With reference to FIG. 1, a hub 1 of a vehicle driving wheel (not shown) is rigidly secured to a constant-velocity joint of known kind, not described in further detail herein after.

The hub 1 rotates on a bearing 3 with a dual set of rolling bodies (in this example bearing balls 4 and 5), running in radially outer raceways 6 and 7 formed in a radially outer, stationary race 8 of bearing 3. The radially outer race 8 forms a radial flange for providing connection of the hub-joint unit to a wheel suspension standard (not shown for simplicity) of the vehicle.

Two corresponding radially inner raceways 10, 11 of bearing 3 are formed in the hub 1 and an intermediate annular member 12 fitted onto hub 1, respectively. As an alternative (not shown), the radially inner raceways 10, 11 may be formed on respective separate intermediate annular members, both fitted onto the hub 1.

The hub 1 is formed by a cylindrical axle 14 having an inner axial through bore 15 open at opposite ends. Hub 1 is further provided with a radial flange 16 for connecting to the driving wheel.

The intermediate annular element 12 forming the radially inner raceway 11 of bearing 3 is located between the hub 1 and the joint 2. As known, annular element 12 is utilized for connecting the hub 1 to the joint 2 to render the assembly of the rolling bodies easier and enhance the rigidity of the hub-joint unit. Intermediate annular element 12 is forcefully fitted on a cylindrical outer seat 18 of axle 14 formed at an end 19 thereof, facing joint 2. Intermediate annular element 12 is axially secured onto the axle 14 by rolling over an end rim of the axle, in order to provide a firm connection.

The joint 2 is connected to the intermediate annular element 12 for transmitting the driving torque by means of a splined coupling 20 consisting of an outer, peripheral axial toothing 20a of annular element 12 and an inner axial toothing 20b of joint 2. Joint 2 is axially locked with respect to hub 1 by means of a spring-lock ring 21 fitted into a circumferential groove 22, part of which is formed in annular element 12 and part in an axially projecting part of a socket portion 23 of joint 2. As soon as the two parts of groove 22 face each other, the spring-lock ring 21 expands and mutually locks the joint 2 and the annular element 12.

As the intermediate annular element 12, once rigidly locked to the axle 14, forms a unit with hub 1, in the following it is assumed that the joint 2 is directly connected to the hub 1, being it understood that this assumption is not intended to limit the scope of the present invention.

To axially secure in reversible manner the hub-joint unit, according to the present invention it is chosen to make use of a spring-lock ring 21 of circular shape in radial cross-section, i.e. a toroidal ring. In such case, the joint 2 can be removed from the hub 1 by applying an axial force to the joint relative to the hub 1. Such an axial force is oriented in the direction that moves joint 2 away from hub 1. The amount of force required must be sufficient to cause a compression of the spring-lock ring 21 into its groove, thereby releasing the joint from the hub.

Owing to the curved shape of the side surface of spring-lock ring 21, the radial components of the force applied to joint 2 act upon the spring-lock ring 21 such as to cause it to withdraw completely into seat 22, thereby allowing the joint 2 to slide axially and be removed from the hub.

In use, in order to apply said axial force without having to disassemble most of the unit from the vehicle, in spite of the scarce space being available and in accordance with the present invention a reaction element 24 consisting of a rigid (for example metallic) diaphragm of annular shape is fixed within the socket portion 23 of joint 2. The diaphragm 24 has an outer edge 25 rigidly connected to the socket portion 23, and an inner edge 26 defining an opening 27 facing the axial bore 15 of hub 1.

Owing to such an arrangement, the diaphragm 24 is adapt to receive an axial thrust applied by means of an extraction tool 28 of known kind, shown in phantom in FIG. 1. Tool 28 is introduced through the bore 15 of hub 1, rests against the diaphragm 24 by means of radially extensible protrusions 29 that can be pushed against the diaphragm 24 from the side of hub 1, so as to apply a thrust against the joint 2. In the reverse operation, to couple the joint 2 to the hub 1, the radial protrusions 29 are applied to the diaphragm 24 from the side of joint 2 and exert a thrust in the opposite way, i.e. towards the hub 1.

To withstand stresses deriving from the application of extraction or coupling thrusts without yielding, the diaphragm 24 has an adequate thickness, for example ranging between about 2 and about 5 mm.

Figure 2A:
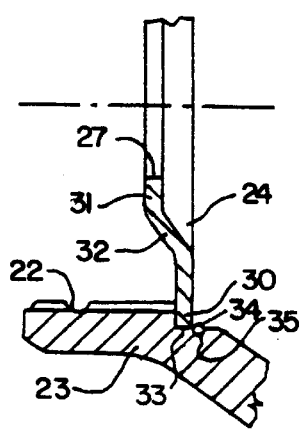
Figure 2B:
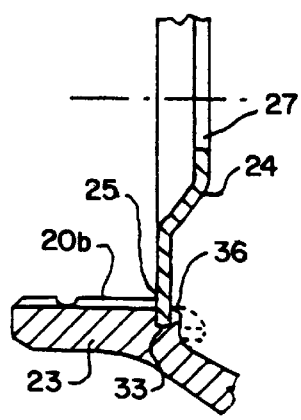

The diaphragm 24 may either be flat (as in FIGS. 1 and 2*c*) or cup-shaped to increase it axial strength (FIGS. 2*a* and 2*b*). In this latter case, the diaphragm has an outer, annular radial portion 30 connected to an inner annular radial portion 31 through a portion 32 tapered in the direction of hub 1 or towards joint 2, according to the available space.

Figure 2C:
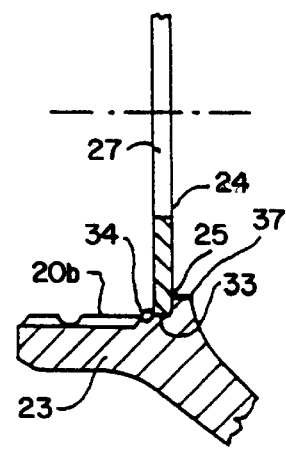

The outer edge 25 of diaphragm 24 is mounted to the socket portion 23 in a circular seat 33 and axially locked against a fixed end shoulder 37 of seat 33 by means of an elastic ring 34 accommodated in a groove 35 obtained in the inside of socket portion 23 (FIG. 2*a*). In accordance with a variant embodiment (FIG. 2*b*), the diaphragm 24 is locked within the socket portion 23 against a shoulder 37 of seat 33 by means of a circular collar 36 axially projecting within socket portion 23. Circular collar 36 is formed by cold-heading against the edge 25 of diaphragm 24. FIG. 2*c* represents a further embodiment of the mounting of diaphragm 24 on the socket portion 23. In this further variant, the shoulder 37 of seat 33 and the elastic ring 34 are located in reverse positions with respect to the arrangement of FIG. 2*a*.

The diaphragm 24 can be mounted to the socket portion 23 in a still different way, as shown in FIG. 2*d*. In this case, the diaphragm 24 is fitted in a seat 33*a* partly formed in a front half-shell 23*a* and partly in the main socket body 23*b*. When jointed, members 23*a* and 23*b* form the socket portion 23 of joint 2. Formed at the end portion of half-shell 23*a* facing the hub 1 are the inner axial toothing 20*b* and the circular seat 22 for spring-lock ring 21, whilst the opposite end portion provides a seat 23*c* for precisely coupling to the main socket body 23*b* of joint 2. The seat 23*c* is formed by an even, centering cylindrical surface 23*d* interposed between two radial shoulders 23*e*. As apparent, the corresponding seat on the main socket portion 23*b* is complementary to that of seat 23*c*.

The diaphragm 24 is inserted within seat 33*a* before joining members 23*a* and 23*b* together. Then, members 23*a* and 23*b* are axially pressed one against the other and preferably welded by a peripheral welding beam S. Still preferably, beam S is performed by a LASER welding machine so as to reduce localized overheating and prevent from deformation occurring at the joint 2.

The diaphragm 24 can also be secured to the socket portion 23 by point welding of an outer diaphragm portion 24*a*, for example of cylindrical, conical, or plane shape, onto an inner surface of socket portion 23, as depicted in FIG. 2*e*.

To prevent the inner parts of the joint 2 from being in communication with the outside through the bore 15 of hub 1, the opening 27 of diaphragm 24 can be closed by means of a disposable cover 38 (FIG. 4).

Hermetical sealing of the hub-joint unit at the location of the splined coupling 20 is attained, in accordance with a variant embodiment of the present invention, by a sealing annular lip 40 (FIGS. 1 and 4) mounted to the outer race 8 of bearing 3 and slidingly engaging an insert 42 forcefully fitted onto the intermediate annular element 12. A further lip 41 co-molded on insert 42 and axially projecting towards the joint is pressed against a sealing surface 43 formed on the end portion of socket portion 23. The sealing lips 40 and 41 can also be integrated in a single device, of known design, for sealing the joint 2 or the bearing 3. For example, lips 40 and 41 can be carried by a common sealing insert.

Such a sealing arrangement prevents moisture and contaminants from entering the joint 2 through the splined coupling 20 between the joint 2 and the hub 1 (or, between the joint 2 and the intermediate annular element 12).

FIGS. 3*a* and 3*b* depict in further detail two different embodiments of the additional lip 41. FIG. 3*c* represents, to an enlarged scale, the additional lip 41 associated with a rotational speed encoder wheel 44, of known design. Encoder wheel 44 is fast for rotation with the intermediate annular element 12 and integral with lip 41. In this example, encoder wheel 44 consists of a ring of magnetized rubber, vulcanized to a metallic insert 45 and forcefully fitted onto intermediate annular element 12 of bearing 3.

To dispense from fitting these sealing devices, shown in FIGS. 2 and 3, according to another aspect of the invention, the diaphragm 24 can be coated with a membrane 48 (FIG. 4). Membrane 48 covers the inner surface of diaphragm 24 facing the joint 2. Membrane 48 can be made of elastomeric material or rubber, co-molded or co-vulcanized to diaphragm 24. As an alternative, the membrane can be of plastic and glued to the diaphragm. Moreover, membrane 48 has a central thicker dome-shaped portion 49, the concavity of which is facing the joint 2. Dome-shaped portion 49 is formed at the opening 27 of diaphragm 24 and is so dimensioned as to allow the passage of an end of extraction tool 28 and accommodate same within the concavity of dome portion 49 (FIG. 1) for such a length to permit to move the extensible protrusions 29 (obviously retracted) beyond diaphragm 24.

In a preferred embodiment, the membrane 48 covers and encompasses also the outer edge 25 of diaphragm 24, particularly by means of a rear fold 50 (FIG. 5) which extends to interposed between the shoulder 37 and the outer edge 25, thereby ensuring hermetical sealing action of joint 2 without the need of additional sealing devices.

What is claimed is:

1. A device for reversibly locking a constant-velocity joint with respect to a hub, wherein said constant-velocity joint is axially locked to said hub by means of a spring-lock ring of circular shape in radial cross section recessed in a circumferential groove in part formed on said joint and in part on said hub, said joint comprising reaction means integral therewith, said reaction means being disposed adjacent to said hub and facing an axial through bore formed in said hub, said reaction means being adapted for co-operation with an extraction tool insertable through said bore to apply to the joint and the spring-lock ring an axial force relative to said hub in either direction so as to separate or couple said joint from or to said hub.

2. A reversible locking device as claimed in claim 1, wherein said reaction means consist of a rigid diaphragm of annular shape providing an outer edge fixed to said joint, and an inner edge defining an opening facing said bore, said opening being so dimensioned as to allow the passage of said extraction tool therethrough.

3. A reversible locking device as claimed in claim 2, wherein said diaphragm is cup-shaped and provides an annular, flat-portion delimiting said opening and being axially offset with respect to said outer edge.

4. A reversible locking device as claimed in claim 2, wherein said diaphragm is mounted to said joint by fitting said outer edge in a circular seat formed immediately adjacent to a splined coupling for connecting to the hub, said outer edge being axially locked in said seat against a shoulder thereof by means of a spring-lock ring.

5. A reversible locking device as claimed in claim 4, wherein said diaphragm is provided with a continuous sealing elastic membrane having a dome-shaped portion at said opening, the convexity of said dome-shaped portion facing said joint.

6. A reversible locking device as claimed in claim 5, wherein said elastic membrane is co-molded onto said diaphragm so as to encompass said outer edge and remain interposed between said outer edge and said seat, said membrane forming a rear fold co-operating in performing sealing action with said shoulder of seat.

7. A reversible locking device as claimed in claim 4, wherein provided on said hub at said splined coupling are lip sealing means co-operating with an outer surface of said joint, in particular said lip sealing means being integrated in a device for hermetically sealing said joint.

8. A reversible locking device as claimed in claim 4, wherein said sealing means further incorporates a metallic or magnetized encoder wheel fast for rotation with said hub.

9. A reversible locking device as claimed in claim 2, wherein said diaphragm is mounted to said joint by fitting said outer edge in a circular seat formed immediately adjacent to a splined coupling for connecting to the hub, said outer edge being axially locked in said seat against a shoulder thereof by means of an axial collar formed within a socket portion of said joint, said collar being formed by cold-heading against said outer edge.

10. A reversible locking device as claimed in claim 2, wherein said diaphragm is mounted to said joint by point welding an outer portion of said diaphragm.

11. A reversible locking device as claimed in claim 2, wherein said diaphragm is mounted to said joint by fitting said outer edge in a circular seat formed in part in a front half-shell and in part in a main body portion, said half-shell and main body portion forming, when joined together, said socket portion of the joint, said circular seat being located at the junction of said half-shell with said main body portion, said diaphragm being sandwiched in said circular seat between said half-shell and said main body portion, said half-shell and said main body portion being preferably secured together by a welded beam.

* * * * *